July 14, 1964  R. G. TAYLOR, JR  3,140,523
SLIP ELEVATORS
Filed Feb. 25, 1959  6 Sheets-Sheet 1
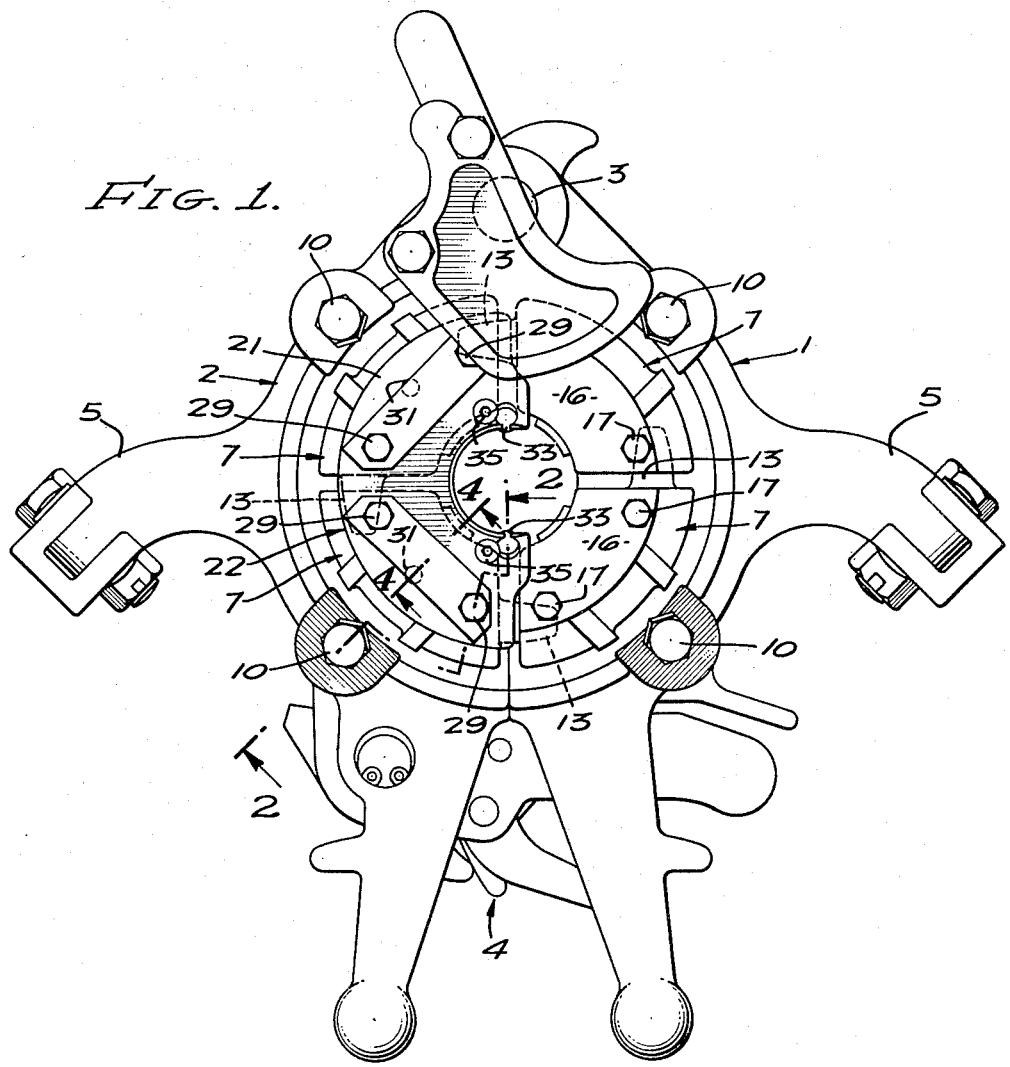
INVENTOR.
RAYMOND G. TAYLOR, JR.
BY
ATTORNEY July 14, 1964    R. G. TAYLOR, JR    3,140,523
SLIP ELEVATORS
Filed Feb. 25, 1959    6 Sheets-Sheet 2
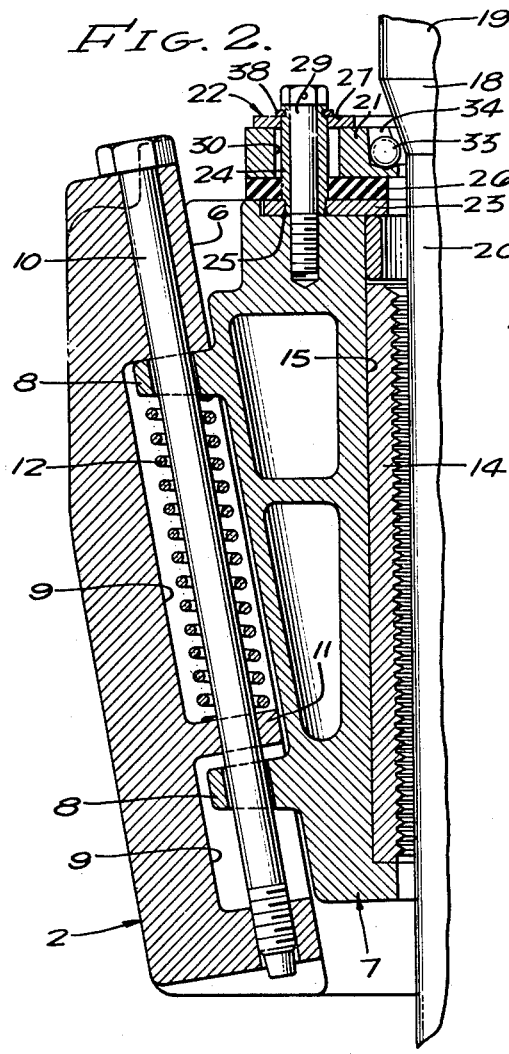
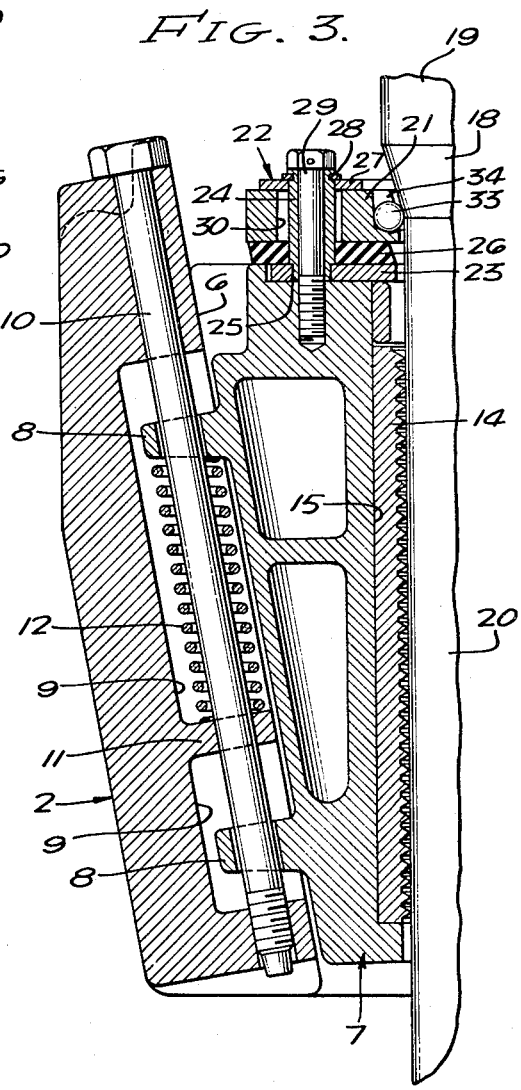
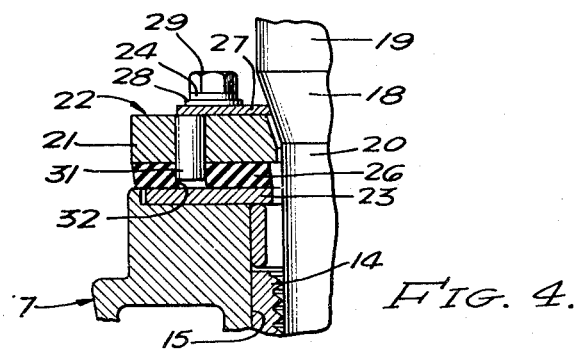
INVENTOR.
RAYMOND G. TAYLOR, JR.
BY
Allen C. Hambley
ATTORNEY

INVENTOR.
RAYMOND G. TAYLOR, JR.
BY
ATTORNEY

July 14, 1964  R. G. TAYLOR, JR  3,140,523
SLIP ELEVATORS

Filed Feb. 25, 1959  6 Sheets-Sheet 4

INVENTOR.
RAYMOND G. TAYLOR, JR.
BY
*Allen E. Hambley*
ATTORNEY

INVENTOR.
RAYMOND G. TAYLOR, JR.
BY
ATTORNEY

July 14, 1964 R. G. TAYLOR, JR 3,140,523
SLIP ELEVATORS
Filed Feb. 25, 1959 6 Sheets-Sheet 6

INVENTOR.
RAYMOND G. TAYLOR, JR.
BY
Allen E. Hambly
ATTORNEY

United States Patent Office 3,140,523
Patented July 14, 1964

3,140,523
SLIP ELEVATORS

Raymond G. Taylor, Jr., Santa Monica, Calif., assignor, by mesne assignments, to Byron Jackson Inc., Long Beach, Calif., a corporation of Delaware
Filed Feb. 25, 1959, Ser. No. 795,553
18 Claims. (Cl. 24—263)

The present invention relates to slip elevators of the type particularly adapted for use in the handling of oil well pipe or conduit, and particularly tubing of the type provided with integral joints and an angularly disposed external upset.

It is the common practice to employ slip elevators in elevating and lowering such pipe where no separate coupling is employed whereby a shoulder is provided for engagement by a cooperative shoulder or flange on the elevator. Slip elevators have a series of longitudinally extended toothed slips adapted to be shifted downwardly and inwardly into engagement with the tubing at a point spaced below the tapered upset, so as to support the pipe. Such elevators heretofore have been provided with various means for automatically setting the slips upon engagement with the upset on the tubing, but such slip setting devices have not been particularly satisfactory.

Among the problems encountered with slip elevator slip setting devices is breakage of the slip setting device assembly when the tubing is very forcibly moved into engagement with the slip setting device and the latter accordingly is subjected to severe shocks.

The present invention contemplates an improved slip setting means in the form of one or more plates overlying the elevator slips and movably connected thereto for movement of the slips radially of the axis of the elevator into and out of engagement with the tubing or other conduit.

In accordance with the invention, novel means is employed for maintaining the slip setting plate or plates in a position for engagement by the tubing upset, while enabling the slip or slips upon which the plate or plates may be supported to move inwardly into engagement with the tubing responsive to downward movement of the slips imparted to the latter from the tubing through the slip setting means.

Generally, it is an object of the invention to provide a novel slip elevator slip setting device comprising plate means secured to the upper end of the slips and providing a portion disposed in the path of and engageable by the tubing upset. Inasmuch as the slips of slip elevators of the type here involved are generally interconnected for unitary movement longitudinally of the elevator body so that they are wedged radially inward into uniform engagement with the tubing, the slip setting device of the invention may be in the form of a single plate, overlying and secured to one or more of the slips and provided with projections thereon disposed substantially for diametrically opposed engagement with the tubing upset.

Alternatively the slip setting device may comprise a pair of plates respectively overlying opposed pairs of slips and so constructed that one plate is engaged by the tubing upset at one side of the tubing, while the other plate engages the tubing upset at the other side of the tubing. Inasmuch as the upset referred to above is generally at a small angle relative to the axis of the tubing, i.e. about 8°, the slip setting device preferably is provided with hard tubing upset engaging portions which will prevent a condition where locking of the slip setting device with the tubing upset will be precluded.

In a specific sense, the invention contemplates the provision of hard facings on the points contacted by the tubing upset or anti-friction means at the points of contact of the slip setting device with the tubing upset.

A further object of the invention is to provide a slip elevator slip setting device which is a unitary subassembly adapted to be easily and quickly mounted on, or removed from the slips.

It is the common practice to provide elevator slips with removable dies disposed in undercut slots in the inner face of the slips, and retained in such slot by means of a retainer plate fastened by screws to the top of the slip. In accordance with the preceding object, the slip setting device of the invention may be employed to retain the slip die elements in the slot in the slip, and may be secured to the slip by fasteners extending into the threaded sockets existing in the slips for the purpose of receiving a screw for securing a die retainer plate.

Yet another object is to provide a slip setting device in the form of a plate engageable with the upset of the tubing to set the slips, the plate having a number of enlarged openings therethrough, through which retainer means extend into the slips, and wherein the openings through the slip setting plate are substantially larger than the fastener means to allow freedom of motion between the slip setting plates and slips as the slips move radially into engagement with the tubing and away from the tubing. In this type of construction there is employed a rubber element which is engaged with the slip setting plate and with the fastener means in such a manner that the rubber will be deformed as the slips and the slip setting device move relatively radially of the tubing during setting of the slips. Accordingly, upon release of the slips the rubber will return the slips and the setting device to a normal relationship.

Other objects and advantages of the invention will be hereinafter described or will become apparent to those skilled in the art and the novel features thereof will be defined in the appended claims.

In the accompanying drawings:

FIG. 1 is a top plan view of a slip elevator embodying a slip setting device made in accordance with the invention;

FIG. 2 is a view in longitudinal section and on an enlarged scale extending on a broken line 2—2 in FIG. 1 through an elevator slip and the elevator body, and showing a fragmentary section of a well conduit about to engage the slip setting device;

FIG. 3 is a view corresponding to FIG. 2, but showing the slip set in engagement with the conduit through the action of the slip setting device;

FIG. 4 is a fragmentary detail view in section, as taken on the line 4—4 of FIG. 1;

Like reference characters in the several views of the drawings and in the following description designate corresponding parts.

Figure 5:
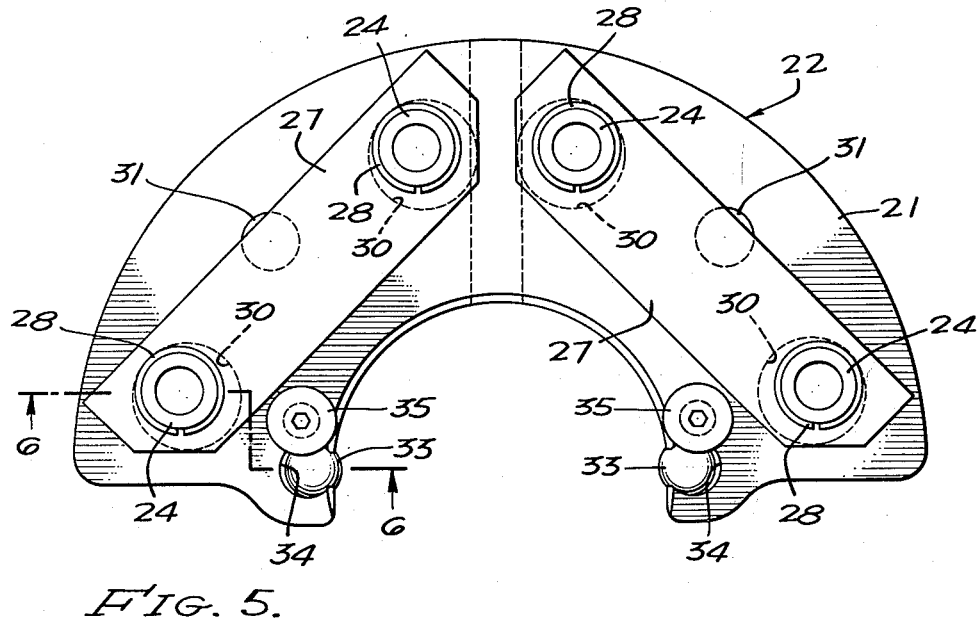
FIG. 5 is an enlarged view in top plan of the slip setting sub-assembly shown in FIGS. 1 thru 4.
Figure 6:
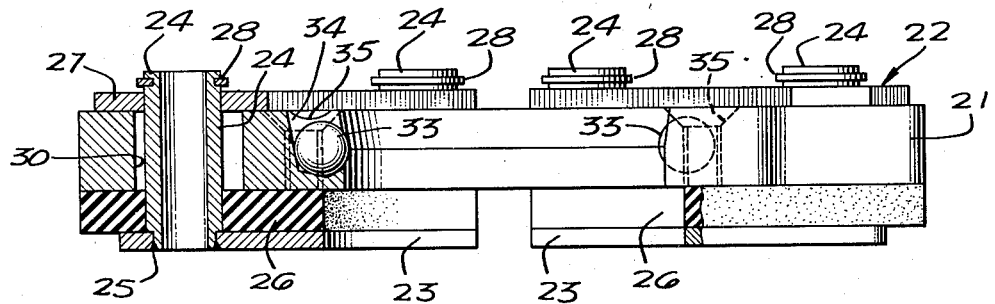
FIG. 6 is a view showing the sub-assembly of FIG. 5, partly in elevation with parts broken away and shown in section on the line 6—6 of FIG. 5.

Referring to FIG. 1, there is generally shown a slip elevator of a well known type. The slip elevator comprises a pair of complemental body sections 1 and 2, hinged together at one side as by a hinge pin 3. The body sections 1 and 2 are provided with cooperative latch means generally designated 4 for holding the body sections against opening. Such latch means is of conventional construction and need not be described here in detail, but reference may be had to U.S. Patent No. 2,257,120, issued to C. A. Lundeen on September 30, 1941, for a description of the details of a suitable latch mechanism.

Each of the body sections 1 and 2 is also provided with an outstanding ear 5 which is constructed in a conventional manner, as shown in the just-mentioned patent, for the reception of elevator links from which the elevator may be suspended from hoisting equipment (not shown).

As best seen in FIG. 2, each of the body sections 1 and 2 is provided with an internal downwardly and inwardly inclined wall 6, so that when the body sections 1 and 2 are closed a generally frusto conical seat or bowl is provided for the reception of a series of circumferentially spaced slips designated 7. Each of the slips 7 is longitudinally tapered and transversely arched so as to conform to the internal taper or bowl of the elevator body, so that upon longitudinal movement of the slips 7 within the elevator body, they will be wedged inwardly upon downward movement and will be expanded outwardly upon upward movement.

Preferably, each of the slips 7 is provided with ears 8 projecting into a slot 9 internally of the body, and a retainer bolt 10 extends through each of the slots 9 and through the ears 8 of the slips 7. Disposed in the slots is a spring seat 11 through which the bolt 10 extends, and a compression spring 12 is interposed between the seat 11 and the upper ear 8 of the slip, so that the spring is compressed upon downward movement of the slip when the slips are being set in engagement with a tubing; whereby, upon release of the slips from the tubing, the spring 12 will return the slips to an elevated and retracted position.

Furthermore, the slips 7 are each preferably provided with a tongue 13 at one side of the slip adapted to project into a tongue-receiving slot in the opposing side of an adjacent slip, so that the slips will move longitudinally of the body as a unit. This construction is more particularly described and illustrated in U.S. Patent No. 2,109,493 to C. A. Lundeen, issued March 1, 1938, and need not be more particularly described herein.

The slips 7, as herein shown, are of the replaceable die type and include a die 14 removably retained in a slot 15 in the slip by means which may comprise a slip setting device made in accordance with the invention, or which may simply comprise an arcuate plate 16, as shown in connection with the pair of slips in the body section 1 of FIG. 1. These plates 16 are secured by screws 17 to the respective slips 7.

As has been pointed out above, the present invention contemplates the provision of a slip setting device which is adapted to automatically set the slips 7 upon engagement of the slip setting device with an external upset 18 (see FIGS. 2-4) formed at the juncture of a tubing joint end 19 with the reduced diameter main section of the tubing as indicated at 20.

As shown in FIGS. 1 thru 6, the slip setting device comprises an arcuate plate 21 which overlies the pair of slips 7 carried by the body section 2. As best seen in FIGS. 2 thru 6, the plate 21 is part of a slip setting sub-assembly, generally designated 22.

The sub-assembly 22 includes a pair of bottom slip die retainer plates 23. Each of the plates 23 carries a pair of upstanding tubular members 24, which are preferably recessed in the plates 23 and welded as at 25. The tubular members 24 extend upwardly through a rubber or other resilient body 26 which is interposed between the plates 23 and the slip setting plate 21.

Disposed above the slip setting plate 21 is a retainer plate 27, through which the tubular member 24 projects. A locking ring 28 is seated in an annular groove at the upper extremity of the tubular member 24 so as to retain the plates 23 and 27 against separation, with the slip setting plate 21 and rubber pad 26 confined therebetween.

The sub-assembly 22 is secured to the pair of slips carried by the body section 2 as by means of pairs of screws 29, which extend through the tubular members 24 and are threaded into the upper ends of the slips 7. It should be noted that the slip setting plate 21 is provided with enlarged openings 30 therethrough, and the tubular members 24 extend through these openings so that relative movement is enabled between the top and bottom plates 27 and 23 of the sub-assembly and the slip setting plate 21 within the limits permitted by the enlarged openings 30. In addition, as best seen in FIG. 4, the slip setting plate 21 has a dowel 31 carried thereby and projecting downwardly into a close-fitting opening 32 in the rubber pad 26.

As shown in FIG. 5, there are two such dowels 31 respectively extending into the rubber pads 26 at a point intermediate the tubular members 24. Therefore, upon movement of the slips and consequently the tubular members 24 relative to the slip setting plate 21, as will occur when the slips are moved radially inwardly in the direction of the tubing 20 for engagement with the latter, the tubular members 24 will stretch or stress the rubber pads 26 about the dowel 31 so that when the slips are retracted, the slip setting plate 21 will be returned by the rubber pads 26 to their normal condition, as shown in FIGS. 2 and 5 particularly.

In order to provide for engagement of the slip setting device with the tubing upset at diametrically opposed points, the plate 21 projects beyond a diametrical line extending across the elevator from the latch 4 to the hinge pin 3. The plate 21 is provided at points which will lie on the just-mentioned diametrical line with tubing upset engaging projections 33. In the embodiment now being described these projections 33 are in the form of anti-friction ball elements shiftably disposed in a bore 34 extending at a slight angle towards the inner margin of the plate 21, so that when the balls 33 are at the base of the bore 34 the balls extend towards one another from the margin of the plate 21 for engagement with the tubing upset 18, as best seen in FIGS. 2 and 3.

In order to retain the balls 33 in the bore 34 against upward displacement of the balls, a screw 35 is threaded into the plate 21 adjacent the bore 34, with the screw head projecting into the bore 34 to limit movement of the balls 33 in an upward direction.

Upon engagement of the balls 33 with the tubing upset the slips 7 will be forced downwardly in the elevator body sections 1 and 2, through the slip setting plate 21, the rubber pads 26, and the bottom or die insert retainer plate 23, whereupon downward movement of the slips 7 in the conical bowl of the elevator body will effect inward movement of the slips into engagement with the tubing 20 relative to the slip setting plate 21, as has been pointed out above.

When the load of the tubing 20 is released from the balls 33 and the tubing 20 is moved upwardly relative to the elevator, the balls 33 will immediately back away from the upset 18 as they tend to ride upwardly in the outwardly inclined bores 34. Accordingly, locking of the tapered upset 18 between the diametrically opposed slip setting projections is precluded by the anti-friction ball elements.

Figure 7:
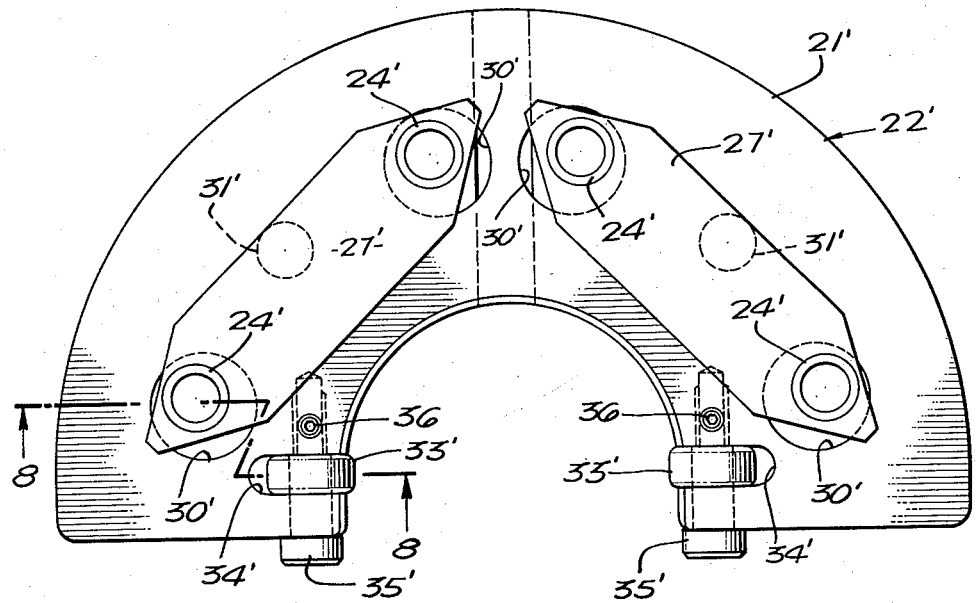
FIG. 7 is a top plan view of a modified slip setting sub-assembly made in accordance with the invention.
Figure 8:
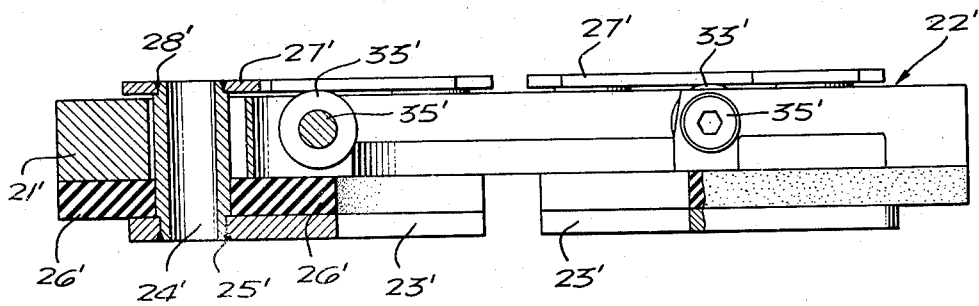
FIG. 8 is a view showing the sub-assembly of FIG. 7 partly in elevation with parts broken away and shown in section on the line 8—8 of FIG. 7.

Referring now to FIGS. 7 and 8, a modified slip setting sub-assembly is shown at 22'. This sub-assembly in most respects is similar to the slip setting sub-assembly previously described, and accordingly primed reference numerals are applied where applicable. It will be noted, however, that in lieu of the snap ring retainer means of the embodiment first described, the top retainer plates 23' of FIGS. 7 and 8 are rigidly connected to the tubular members 24', as by welding at 28'. In addition, the projections engageable with the tubing upset in FIGS. 7 and 8 are constituted by rollers 33' disposed in opposed radially extended slots 34' and journalled on a shoulder bolt 35' extending across the respective slots 24'. The shoulder bolts 35' are secured in place by a set screw 36. It will be noted that the rollers 33' function similarly to the balls 33 in affording an anti-friction contact for engagement with the tubing upset 18.

Figure 9:
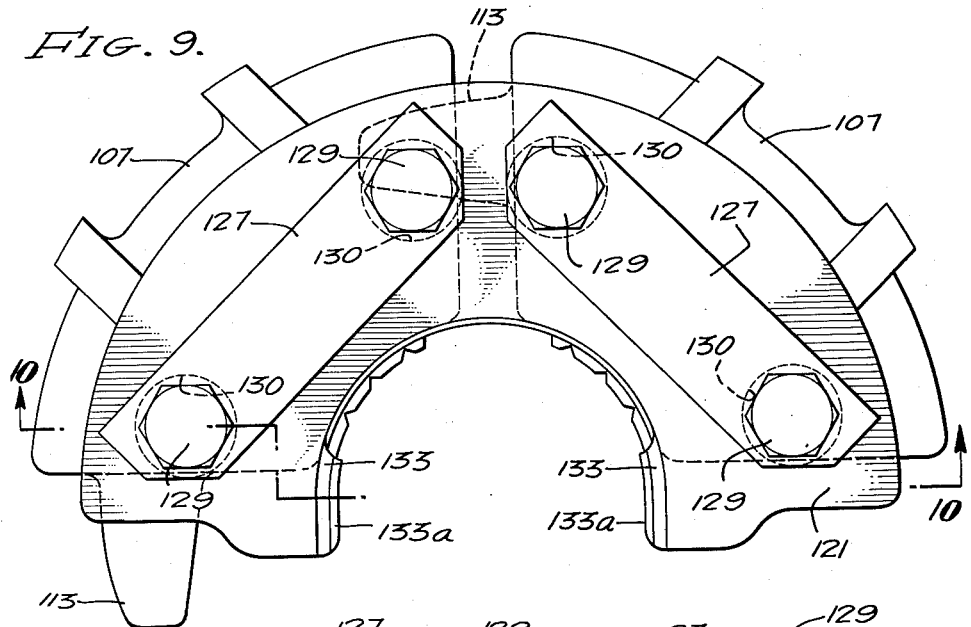
FIG. 9 is a view in top plan of a further form of slip setting device of the invention as applied to a pair of slips.
Figure 10:
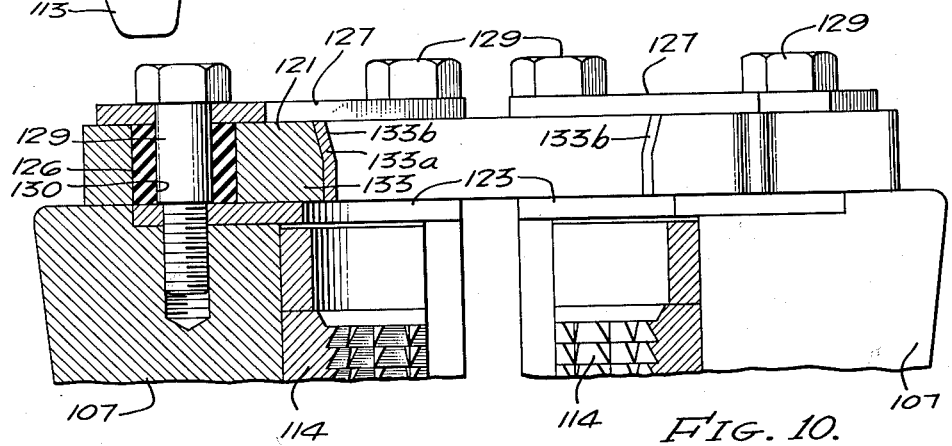
FIG. 10 is a fragmentary view in section as taken on the line 10—10 of FIG. 9.

Referring now to FIGS. 9 and 10, a further embodiment of the invention is shown, wherein an arcuate slip setting plate 121 is connected to the upper ends of slips 107 by means of shoulder bolts 129 which extend through enlarged openings 130 through the slip setting plate 121 and which shoulder on slip die retainer plates 123. These plates 123 overlie the undercut groove 115 in which the slip die inserts 114 are removably disposed. Preferably a retainer bar or plate 127 is disposed between the heads of the shoulder bolts 129 and the slip setting plate 121, there being a pair of bolts 129 threaded into each slip 107.

In this embodiment the diametrically opposed projections which are engageable with the tubing upset are in the form of rigid arcuate protuberances 133, provided with hard-facing material 133a, formed with a face 133b engageable with the tubing upset. The angle of face 133b is selected so that it will provide a non-locking wedge angle with the tubing upset when coengaged therewith, and the hard-facing material affords durability against damage caused by slamming of a tubing upset into engagement with the projection 133.

Disposed in the openings 130 are rubber bushings 126 which provide a resilient body interposed between the shoulder bolts 129 and the slip setting plate 121 so that the rubber bushings must be deformed as the slips 107 move towards the tubing. Accordingly, the bushings 126 serve the same function as the pads 26 and 26' previously described and shown in the forms of FIGS. 1 thru 8. However, the pads 26 and 26' serve the further function of cushioning the slip setting plates 21 and 21'.

As referred to in connection with the embodiment of FIGS. 1 thru 8, the slips are adapted to move longitudinally as a unit. Accordingly, outstanding ears 113 are formed on slips 107 and are adapted to project into complemental recesses in the adjacent slip, as is customary.

Figure 11:
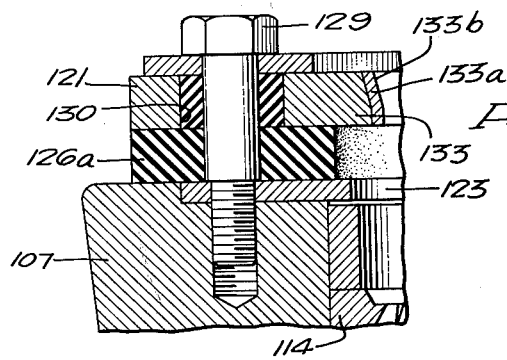
FIG. 11 is a fragmentary detail view in vertical section showing a modified cushioned mounting for a slip setting device similar to that shown in FIGS. 9 and 10.

Therefore a further modification of the invention is shown in FIG. 11, wherein the structure is essentially the same as that shown in FIGS. 9 and 10 (and like reference characters are employed) except for the fact that an additional cushioning pad 126a is provided between the slip setting plate 121 and the slips 107.

Figure 12:
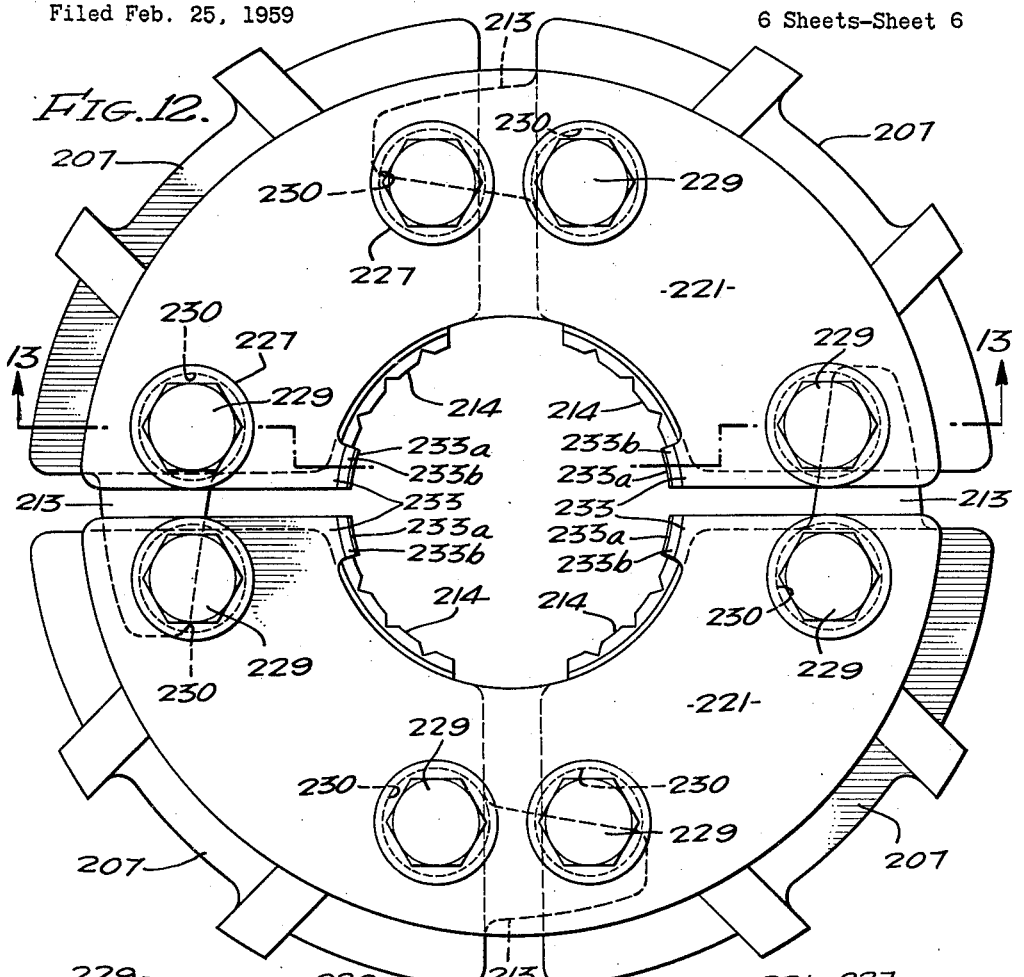
FIG. 12 is a view in top plan showing a further form of setting device made in accordance with the invention and including a pair of slip setting plates respectively connected to opposed pairs of slips.
Figure 13:
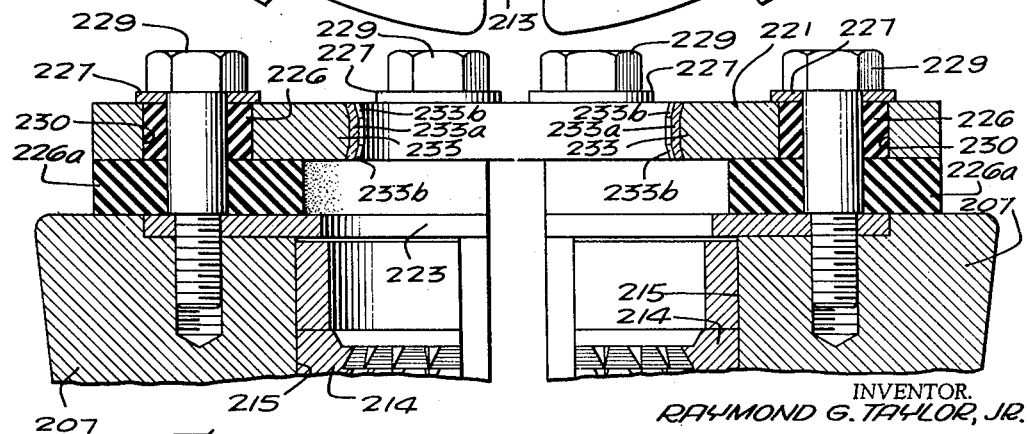
FIG. 13 is a fragmentary view in vertical section as taken on the line 13—13 of FIG. 12.

Still another embodiment of the invention is shown in FIGS. 12 and 13. In this embodiment, instead of employing a single slip setting plate as in the embodiments previously described, a pair of arcuate slip setting plates 221 are employed, each of these plates being secured to a pair of slips 207, which slips 207 would be disposed at opposite sides of the hinge pin 3 and latch 4 shown in FIG. 1. The mounting of the slip setting plates 221 to the respective opposite pairs of slips 207, as specifically shown herein, is identical to that described in relation to the form of the invention shown in FIG. 11. However, it should be noted that the plates 221 may be part of unitary sub-assemblies as shown in the embodiment of FIGS. 1 thru 6, or in FIGS. 7 and 8. Alternatively, the slip setting plates 221 may be secured to the slips 207 as illustrated in connection with the embodiment of FIGS. 9 and 10.

As specifically illustrated, the opposed plates 221 are connected to the adjacent pairs of slips 207 by shoulder bolts 229 extending through enlarged openings 230 through the plates 221 and shouldering on slip die insert retainer plates 223 which retain die inserts 214 in place in the undercut grooves 215 therefor.

In lieu of retainer plates as referred to hereinabove, washers 227 are disposed beneath the heads of the shoulder bolts 229 and overlie the enlarged openings 230 through the plates 221. Disposed in the openings 230 are rubber or other resilient bushings 226 constituting deformable means interposed between the slip setting plates 221 and the securing means, for resiliently resisting inward movement of the slips 207 as they are moving into engagement with the well pipe or tubing, as has been previously described. In addition, a pad 226a of rubber or the like, is disposed between each of the plates 221 and the respective slips 207.

Each of the plates 221 is provided with a protuberance 233 which is diametrically opposed to a protuberance 233 of the other slip setting plate 221. In such a construction it will be noted that the protuberances 233 of each plate 221 will contact the tubing to one side of a diametrical line across the tubing, i.e. on opposite sides of a line extending between the hinge pin 3 and latch means 4 of an elevator, as shown in FIG. 1, while the protuberances 233 on the other plate 221 contact the tubing on the opposite side of such diametrical line.

Inasmuch as the plates 221 are capable of bodily movement laterally of the tubing, it will be noted that the rubber bushings 226 also resist spreading movement of the plates 221 due to the wedging effect of the tapered upset on the tubing to such an extent that the plates would be able to ride over the upset before the slips 207 have been wedged into engagement with the tubing beneath the upset.

Accordingly, the protuberances 233 on the respective plates 221 are resiliently maintained in engagement with the tubing upset, and there is no likelihood of the diametrically opposed protuberances 233 on opposite plates 221 binding or locking in engagement with the tubing upset.

As in the embodiments shown in FIGS. 9 thru 11, the protuberances 233 are preferably provided with hard-facing material as at 233a, but instead of being provided with a single tubing upset engaging face as in the just-mentioned previously described embodiments, the protuberances 233 are provided with upper and lower tubing upset engaging faces 233b, so that the effective life of the plates 221 may be doubled upon inversion of such plates.

From the foregoing it will be observed that the invention provides in its various embodiments plate means for engagement with a radial projection on the tubing, i.e. an upset on a well pipe or tubing, which plate means is mounted on the axially and radially movable slips so as to apply the load of the tubing or other well conduit to the slips and force the latter downwardly in the tapered slip housing bowl, thus to effect radial movement of the slips. However, it should be understood that the invention is not limited to use only in conjunction with externally upset tubing, but may, if desired, be employed in conjunction with tubing where a cylindrical coupling provides a radial shoulder engageable with the slip setting plate or plates.

In addition it will be noted that resilient means is interposed between the plate means and the means for securing the plate means to the slips, which resilient means is deformed, i.e. compressed or stressed, as the plate means and the slips move relatively radially in a slip setting direction, and such resilient means tends to return the plate means and the slips to a normal relationship upon release of the slips or upon removal of the tubing or well conduit load from the slip setting plate means.

While the specific details of the several embodiments of the invention have been herein shown and described, changes and alterations may be resorted to without departing from the spirit of the invention as defined in the appended claims.

I claim:
1. In a slip elevator for well pipe, comprising an elevator body having a tapered bowl, a plurality of elongated slips spaced circumferentially of the bowl and movable longitudinally and radially in said bowl into and out of engagement with a pipe extending longitudinally through said bowl between said slips, said slips having their upper ends exposed in said bowl, the improvement comprising an arcuate plate overlying said slips at one side of a diametrical line extending across said bowl, said plate having opposed portions lying on said diametrical line for engagement with an enlargement on said pipe, means supporting said plate for movement longitudinally of the elevator, said plate being operatively engaged with the exposed upper ends of said slips for forcing the slips downwardly in said bowl upon the weight of said pipe forcing said plate longitudinally of the elevator in one direction, resilient means resisting such movement of said plate, and said means supporting said plate including fasteners connecting said plate to said slips and providing for movement of said slips toward one another relative to said plate.

2. A slip elevator comprising a body having a tapered bowl, a plurality of slips disposed in said bowl for longitudinal and radial movement, a plate overlying certain of said slips and engageable therewith to effect longitudinal downward movement of said slips in said bowl upon downward movement of said plate, coengageable means on said slips for interconnecting said slips for such longitudinal movement as a unit, means including fasteners extending through said plate and supporting said plate on said slips in overlying relation to said slips for movement towards and away from one another in said bowl, and means resiliently resisting movement of said slips relative to said plate.

3. A slip elevator as defined in claim 2 wherein the last-mentioned means includes resilient bushings surrounding said fasteners, said plate having enlarged openings through which said fasteners extend and said bushings being disposed in said openings.

4. A slip elevator as defined in claim 2, wherein the last-mentioned means includes, deformable means interposed between said plate and said slips.

5. A center latch slip type elevator for well pipe having an externally enlarged coupling end, comprising: a pair of complemental body parts, means hingedly interconnecting said body parts at one end of the latter for swinging movement of the other ends of the body parts towards and away from one another, means for releasably latching said other ends of said body parts together, said body parts having downwardly tapered internal surfaces providing a slip bowl, a plurality of longitudinally tapered slip elements shiftably supported in each of said body parts for vertical movement in said slip bowl with the slip elements of each body part disposed on the respective opposite sides of the means hingedly interconnecting said body parts, means on said slip elements interconnecting said slip elements for such vertical movement as a unit, means normally biasing said slip elements upwardly in said slip bowl, and slip setting means disposed above and operatively engageable with said slip elements and engageable by the aforesaid externally enlarged pipe coupling end for shifting said slips downwardly in said bowl with consequent movement of said slip elements towards one another into supporting engagement with said pipe beneath said externally enlarged coupling end, said slip setting means including a plate overlying said slip elements and having an open sided pipe receiving recess for reception of said pipe upon closing of the elevator thereabout, said plate having portions diametrically opposed across said recess for engagement by said externally enlarged coupling end upon longitudinal movement of the pipe through said plate recess, and means including fasteners connecting said plate to said slip elements and providing for movement of said slip elements toward one another relative to said plate.

6. A center latch slip type elevator for well pipe having an externally enlarged coupling end, comprising: a pair of complemental body parts, means hingedly interconnecting said body parts at one end of the latter for swinging movement of the other ends of the body parts towards and away from one another, means for releasably latching said other ends of said body parts together, said body parts having downwardly tapered internal surfaces providing a slip bowl, a plurality of longitudinally tapered slip elements shiftably supported in each of said body parts for vertical movement in said slip bowl, and slip setting means disposed above and operatively engageable with said slip elements and engageable by the aforesaid externally enlarged pipe coupling end for shifting said slips downwardly in said bowl with consequent movement of said slip elements towards one another into supporting engagement with said pipe beneath said externally enlarged coupling end, said slip setting means including a plate overlying said slip elements and having an open sided pipe receiving recess for reception of said pipe upon closing of the elevator thereabout, said plate having a marginal portion forming said recess disposed for engagement by said externally enlarged coupling end upon longitudinal movement of the pipe through said plate recess and means including fasteners connecting said plate to said slip elements and providing for movement of said slip elements toward one another relative to said plate.

7. A center latch slip type elevator for well pipe having an externally enlarged coupling end, comprising: a pair of complemental body parts, means hingedly interconnecting said body parts at one end of the latter for swinging movement of the other ends of the body parts towards and away from one another, means for releasably latching said other ends of said body parts together, said body parts having downwardly tapered internal surfaces providing a slip bowl, a plurality of longitudinally tapered slip elements shiftably supported in each of said body parts for vertical movement in said slip bowl, and slip setting means disposed above and operatively engageable with said slip elements and engageable by the aforesaid externally enlarged pipe coupling end for shifting said slips downwardly in said bowl with consequent movement of said slip elements towards one another into supporting engagement with said pipe beneath said externally enlarged coupling end, said slip setting means including plate means overlying said slip elements and forming a pipe receiving recess for reception of said pipe upon closing of the elevator thereabout, said plate means having portions diametrically opposed across said recess for engagement by said externally enlarged coupling end upon longitudinal movement of the pipe through said pipe receiving recess, and means including fasteners connecting said plate means to said slip elements and providing for movement of said slip elements toward one another relative to said plate means.

8. A well pipe elevator device as defined in claim 7, including resilient means interposed between said plate means and said slips for resisting relative movement of said slips and said plate means.

9. A well pipe elevator device as defined in claim 7, wherein said portions of said plate means engageable with said externally enlarged coupling end comprise integral hardened contact portions.

10. A well pipe elevator device as defined in claim 7, wherein said portions of said plate means engageable with said externally enlarged coupling end comprise anti-frictional elements.

11. A well pipe elevator device as defined in claim 7, wherein said plate means is provided with enlarged openings therein, said fasteners extending through said openings into engagement with said slips, and including a rubber cushion interposed between said plate means and the slips underlying said plate means, said fasteners extending through said rubber cushion, and said plate means having a projection lying between said spaced portions and extending into said rubber cushion.

12. A well pipe elevator device as defined in claim 7, wherein said plate means is provided with enlarged openings therein, said fasteners extending through said openings into engagement with said slips, and including a rubber bushing interposed in said enlarged openings between said securing means and said plate means, and including a rubber cushion underlying said plate means and engaged with said slips beneath said plate means.

13. A well pipe elevator device as defined in claim 7, wherein said plate means is provided with enlarged openings therein, said fasteners extending through said openings into engagement with said slips underlying said plate means, and deformable means operatively interposed between said fasteners and said plate means and resisting relative movement of said plate means and said slips.

14. A well pipe elevator device as defined in claim 13, wherein said deformable means comprise a rubber bushing interposed in said enlarged openings between said fasteners and said plate means.

15. In a slip elevator for well pipe, comprising an elevator body having a tapered bowl, a plurality of elongated slips spaced circumferentially of the bowl and movable longitudinally and radially in said bowl into and out of engagement with a pipe extending longitudinally through said bowl between said slips, said slips having their upper ends exposed in said bowl, the improvement comprising an arcuate plate overlying said slips at one side of a diametrical line extending across said bowl, said plate having opposed portions lying on said diametrical line for engagement with an enlargement on said pipe, means supporting said plate for movement longitudinally of the elevator, said plate being operatively engaged with the exposed upper ends of said slips for forcing the slips downwardly in said bowl upon the weight of said pipe forcing said plate longitudinally of the elevator in one direction, a resilient pad underlying said plate, a second plate underlying said pad, retainer means interconnecting said plates and extending through said pad, said retainer means comprising an element underlying said arcuate plate and a member interconnecting said retainer element and said second plate, said arcuate plate having an enlarged opening through which said last-mentioned member loosely extends.

16. A slip elevator as defined in claim 15, including a rubber bushing interposed in said opening between said arcuate plate and said member.

17. A slip elevator as defined in claim 15, wherein said means supporting said plate includes a fastener element extending through said member interconnecting said retainer element and said second plate.

18. In a slip elevator for well pipe, comprising an elevator body having a tapered bowl, a plurality of elongated slips spaced circumferentially of the bowl and movable longitudinally and radially in said bowl into and out of engagement with a pipe extending longitudinally through said bowl between said slips, said slips having their upper ends exposed in said bowl, the improvement comprising an arcuate plate overlying said slips at one side of a diametrical line extending across said bowl, said plate having opposed portions lying on said diametrical line for engagement with an enlargement on said pipe, said opposed portions each comprising a hard-faced arcuate projection having beveled pipe enlargement engaging surfaces at its opposite sides, whereby said plate may be employed in inverted positions, means supporting said plate for movement longitudinally of the elevator, said plate being operatively engaged with the exposed upper ends of said slips for forcing the slips downwardly in said bowl upon the weight of said pipe forcing said plate longitudinally of the elevator in one direction, resilient means resisting such movement of said plate, and said means supporting said plate including fasteners connecting said plate to said slips and providing for movement of said slips toward one another relative to said plate.

References Cited in the file of this patent

UNITED STATES PATENTS

| | | |
|---|---|---|
| 1,436,246 | Greve | Nov. 21, 1922 |
| 1,517,979 | Greathouse | Dec. 2, 1924 |
| 1,664,461 | Montgomery | Apr. 3, 1928 |
| 1,834,429 | Smith | Dec. 1, 1931 |
| 1,909,602 | Young | May 16, 1933 |
| 1,920,617 | Young | Aug. 1, 1933 |
| 2,048,209 | Young et al. | July 21, 1936 |
| 2,051,998 | Monroe | Aug. 25, 1936 |
| 2,126,933 | Stone et al. | Aug. 16, 1938 |
| 2,173,079 | Moody | Sept. 12, 1939 |
| 2,245,592 | Jones | June 17, 1941 |
| 2,256,155 | Smith | Sept. 16, 1941 |
| 2,563,851 | Lundeen et al. | Aug. 14, 1951 |
| 2,719,025 | Stone | Sept. 27, 1955 |
| 3,032,366 | Meek | May 1, 1962 |

FOREIGN PATENTS

| | | |
|---|---|---|
| 1,155,647 | France | Dec. 2, 1957 |